UNITED STATES PATENT OFFICE.

EDWARD MARK SLOCUM, OF MEDAN, SUMATRA, DUTCH EAST INDIES, ASSIGNOR TO GENERAL RUBBER COMPANY, A CORPORATION OF NEW JERSEY.

PROCESS OF COAGULATING LATEX AND PRODUCT THEREOF.

1,270,887.  Specification of Letters Patent.  Patented July 2, 1918.

No Drawing.  Application filed February 23, 1917. Serial No. 150,352.

*To all whom it may concern:*

Be it known that I, EDWARD MARK SLOCUM, a citizen of the United States, residing at Medan, Province of Deli, Sumatra, Dutch East Indies, have invented certain new and useful Improvements in Processes of Coagulating Latex and Products Thereof, of which the following is a full, clear, and exact description.

This invention relates to rubber coagulum or similar material for vulcanization and to a process for the preparation of the same from latex. It is more particularly directed to a precipitated latex or coagulum conserving therewithin the nitrogenous and other constituents normally present, and to a process for producing the same.

These nitrogenous and other materials such as proteins, sugars, gums, etc., held in solution, suspension, or other form in the latex and which also occur in the coagulum under the ordinary conditions of coagulation, have heretofore exuded from the coagulum as formed producing a slime upon the surface thereof. Washing of the coagulum for removal of the slime, as heretofore practised, is objectionable due to the loss from the rubber of these nitrogenous and other materials which represent valuable constituents thereof, since, when disseminated throughout the mass, they aid in vulcanization, acting as catalysts, and cause a general improvement in the physical properties of the cured rubber.

Further, aside from this change in the constitution of the rubber resulting from the removal of these constituents, the exudation of these materials in the form of slime is also objectionable because they offer a field for growth of molds, yeast, fungi, bacteria, and the larvæ of vermin, and interfere with the drying of the coagulum by forming a coating over its surface. The washing practised is of little value also in overcoming these objections adding little if any speed to drying and resulting in only temporary removal of the field for bacterial and other growth, since if the coagulum is allowed to stand after washing exudation again occurs.

One of my objects has been accordingly to provide a rubber coagulum from latex for vulcanization adapted to dry rapidly, free from the tendency to darken, free from slime formation, and hence presenting no field for plant or animal growth, and including the nitrogenous and other materials therein thoroughly disseminated throughout the mass. Another object has been to devise a simple, efficient process for the production of such coagulum.

In producing the coagulum, hevea or other form of latex is subjected to a reactive agent capable of forming in the solution, suspension, emulsion, or other form of nitrogenous material therein, a substance or substances insoluble in such solution, suspension, or emulsion. The preferred reactive agent which I employ is boric acid which may be conveniently applied in solution. I have found that if boric acid is added in sufficiently small quantity approximately one third of one per cent. there will be substantially no acceleration of coagulation, while the nitrogenous material is practically wholly insolubilized. Acceleration of coagulation is preferably avoided since it causes a "salting out" of the latex and the consequent formation of non-uniform masses of coagulum. Sulfur or other vulcanizing agent may be added to the latex prior to the treatment indicated or may be added subsequent to such treatment; or may be added at any time prior to vulcanization.

It has been found that the coagulum produced by treatment of latex of hevea in the above manner possesses excellent characteristics in that it is free from slime and tendency to darken, and the nitrogenous constituents are thoroughly disseminated throughout the mass. A general improvement of the physical characteristics of the coagulum has also been observed. Such coagulum has also been found to dry rapidly and to offer substantially no attraction to bacteria, vermin, etc.

It will be understood that although boric acid has been mentioned as the preferred reactive agent that it is simply a representative of a large class of substances which may be similarly employed. These substances include various precipitants of proteins, polypeptids, peptones, nucleins, albumins, gelatins, and many of their cleavage and condensation products, all amino acids, esters, anhydrids, polymers and the like. More specifically the class of substances includes various compounds such as complexes, salts, esters, oxids, hydroxids, etc., of various chemical elements but especially the metalloids and metals able to form acid-like hydroxy-compounds. Boric acid may be replaced by salts, esters, polymers, and mixed anhydrids with other acids or other combinations containing boron.

Having thus described my invention, what I claim and desire to protect by Letters Patent is:

1. A mass comprising rubber obtained from latex treated with a reactive agent substantially free from tendency to accelerate coagulation and adapted to form an insoluble material in said latex.

2. A mass comprising rubber obtained from latex treated with an inorganic substance substantially free from tendency to accelerate coagulation and adapted to form an insoluble material in said latex.

3. A mass comprising rubber obtained from latex treated with a metalloid compound substantially free from tendency to accelerate coagulation and adapted to form an insoluble material in said latex.

4. A mass comprising rubber and insoluble nitrogenous matter or the like obtained from latex treated with a substance containing boron in insufficient quantity to accelerate coagulation.

5. A mass comprising rubber and insoluble nitrogenous matter or the like obtained from latex treated with an oxy compound of boron in insufficient quantity to accelerate coagulation.

6. A mass comprising rubber obtained from latex treated with boric acid in insufficient quantity to accelerate coagulation.

7. A process for treating latex which comprises adding thereto a reactive agent adapted to form an insoluble material in said latex without accelerating coagulation thereof, coagulating the latex, and adding a vulcanizing agent thereto.

8. A process for treating latex which comprises adding thereto an inorganic substance adapted to form an insoluble material in said latex without accelerating coagulation thereof, coagulating the latex, and adding a vulcanizing agent thereto.

9. A process for treating latex which comprises adding thereto a metalloid compound adapted to form an insoluble material in said latex without accelerating coagulation thereof, coagulating the latex, and adding a vulcanizing agent thereto.

10. A process for treating latex which comprises adding thereto a reactive agent adapted to form an insoluble material in said latex without accelerating coagulation thereof, and coagulating the latex.

11. A process for treating latex which comprises adding thereto an inorganic substance adapted to form an insoluble material in said latex without accelerating coagulation thereof, and coagulating the latex.

12. A process for treating latex which comprises adding thereto a metalloid compound adapted to form an insoluble material in said latex without accelerating coagulation thereof, and coagulating the latex.

Signed at New York, county and State of New York, this 8th day of February, 1917.

EDWARD MARK SLOCUM.